(12) United States Patent
Takagi et al.

(10) Patent No.: US 7,438,665 B2
(45) Date of Patent: Oct. 21, 2008

(54) CONTROL SYSTEM FOR INTERNAL COMBUSTION ENGINE

(75) Inventors: Jiro Takagi, Wako (JP); Yasuaki Asaki, Wako (JP); Nobuyuki Kawaguchi, Wako (JP); Makoto Segawa, Wako (JP); Hirosuke Niwa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 166 days.

(21) Appl. No.: 11/589,474

(22) Filed: Oct. 30, 2006

(65) Prior Publication Data
US 2007/0042863 A1    Feb. 22, 2007

Related U.S. Application Data

(62) Division of application No. 10/826,102, filed on Apr. 15, 2004, now Pat. No. 7,169,080.

(30) Foreign Application Priority Data
Apr. 18, 2003    (JP)    ............... 2003-114029

(51) Int. Cl.
B60W 10/04    (2006.01)
(52) U.S. Cl. .............. 477/107; 477/110; 123/198 F
(58) Field of Classification Search ........... 477/107, 477/110; 123/198 F
See application file for complete search history.

(56) References Cited

U.S. PATENT DOCUMENTS

| 4,184,470 | A | 1/1980 | Iizuka et al. |
|---|---|---|---|
| 4,494,502 | A | 1/1985 | Endo et al. |
| 5,481,461 | A | 1/1996 | Miyamoto et al. |
| 6,138,636 | A | 10/2000 | Kohno et al. |
| 6,499,470 | B2 | 12/2002 | Takagi et al. |
| 6,691,021 | B2 | 2/2004 | Takagi et al. |
| 6,938,598 | B1 | 9/2005 | Lewis et al. |
| 6,947,828 | B2 * | 9/2005 | Fujiwara et al. ............. 701/111 |
| 7,104,244 | B2 * | 9/2006 | Nishi et al. ............... 123/198 F |
| 7,169,080 | B2 * | 1/2007 | Takagi et al. ............... 477/107 |
| 7,179,199 | B2 * | 2/2007 | Kushiyama et al. ........ 477/181 |

FOREIGN PATENT DOCUMENTS

JP    8-105339    4/1996

* cited by examiner

*Primary Examiner*—Ha D. Ho
(74) *Attorney, Agent, or Firm*—Lahive & Cockfield, LLP; Anthony A. Laurentano, Esq.

(57) ABSTRACT

A control system for an internal combustion engine having a plurality of cylinders and a switching mechanism for switching between an all-cylinder operation in which all of the plurality of cylinders are operated and a partial-cylinder operation in which at least one of the plurality of cylinders is halted. A condition for performing the partial-cylinder operation is determined, based on the detected operating parameters of the vehicle driven by the engine. A result of the determination is modified so that the partial-cylinder operation may be continued, when the detected operating parameters satisfy a predetermined continuation condition within a predetermined time period from the time a vehicle operating state where the condition for performing the partial-cylinder operation is satisfied, has changed to another vehicle operating state where the condition for performing the partial-cylinder operation is not satisfied.

9 Claims, 9 Drawing Sheets

CONTROL SYSTEM FOR INTERNAL COMBUSTION ENGINE

RELATED APPLICATIONS

The present invention is a divisional application of U.S. patent application Ser. No. 10/826,102 filed Apr. 15, 2004, entitled "Control System For Internal Combustion Engine" which, in turn, claims priority to Japanese Patent Application Number 2003-114029 filed Apr. 18, 2003, the contents of which are herein incorporated by reference.

BACKGROUND OF THE INVENTION

1. Field of the Invention

The present invention relates to a control system for an internal combustion engine, and more particularly to a control system for an internal combustion engine having a plurality of cylinders, provided with a cylinder halting mechanism for halting operation of some of the cylinders.

2. Description of the Related Art

Japanese Patent Laid-Open No. Hei 8-105339 discloses a control system for an internal combustion engine provided with a cylinder halting mechanism. In this control system, partial-cylinder operation in which some of cylinders of the engine are halted, and all-cylinder operation in which all of the cylinders are operated, are switched according to an engine load, i.e., a throttle valve opening. Specifically, according to this control system, the partial-cylinder operation is performed when the throttle valve opening TPS is less than a switching throttle valve opening TPS1 which is set according to the engine rotational speed Ne.

According to the conventional control system described above, if the throttle valve opening TPS during the partial-cylinder operation exceeds the switching throttle valve opening TPS1 and then becomes lower than the switching throttle valve opening TPS1 immediately, the operation mode of the engine changes from the partial-cylinder operation to the all-cylinder operation and then changes back to the all-cylinder operation immediately. That is, the operation mode of the engine changes frequently in a short time period. It is well known in the art that, when the throttle valve opening TPS is compared with the switching throttle valve opening TPS1, and the operation mode of the engine is switched according to a result of the comparison, the comparison is performed with hysteresis. However, even by the comparison with hysteresis, frequent switching sometimes occurs, and there is a problem that a switching shock (a sudden change of the engine torque by the switching) occurs frequently, or sufficient improvement in the fuel efficiency cannot be obtained.

SUMMARY OF THE INVENTION

It is an object of the present invention to provide a control system for an internal combustion engine which can appropriately control a transition from the partial-cylinder operation to the all-cylinder operation, to thereby prevent frequent switching of the engine operation mode from occurring in a short time period.

The present invention provides a control system for an internal combustion engine (1) having a plurality of cylinders and switching means (30) for switching between an all-cylinder operation in which all of the plurality of cylinders are operated and a partial-cylinder operation in which at least one of the plurality of cylinders is halted. The control system includes operating parameter detecting means, condition determining means, modifying means, and instructing means. The operating parameter detecting means detects operating parameters (TH, TW, TA, NE, VP) of a vehicle driven by the engine. The operating parameters includes at least one operating parameter of the engine. The condition determining means determines a condition for performing the partial-cylinder operation, based on the operating parameters detected by the operating parameter detecting means. The modifying means modifies a result (FCYLSTP=0) of the determination by the condition determining means so that the partial-cylinder operation may be continued (FCYLSTP=1), when the detected operating parameters satisfy a predetermined continuation condition (S36, S37, S38) within a predetermined time period (TSTPTMP) from the time a vehicle operating state where the condition for performing the partial-cylinder operation is satisfied, has changed to another vehicle operating state where the condition for performing the partial-cylinder operation is not satisfied. The instructing means instructs the switching means (30) to perform the partial-cylinder operation or the all-cylinder operation according to the result of the determination modified by the modifying means.

With this configuration, when the operating parameters satisfy the predetermined continuation condition within a predetermined time period from the time a vehicle operating state where the condition for performing the partial-cylinder operation is satisfied, has changed to another vehicle operating state where the condition for performing the partial-cylinder operation is not satisfied. the switching means is controlled so as to continue the partial-cylinder operation. Accordingly, when the vehicle driver operates the accelerator pedal during the partial-cylinder operation in such a manner that he returns the accelerator pedal immediately after he depresses the acceleration pedal a little without an intention of accelerating the vehicle, the operation mode of the engine is not switched. Consequently, frequent switching shocks or deterioration of the fuel efficiency can be prevented.

Preferably, the operating parameter detecting means detects an operation amount (TH) indicative of a required output power of the engine, and the condition determining means determines that the condition for performing the partial-cylinder operation is satisfied when the detected operation amount (TH) is less than a determination threshold value (THCS).

Preferably, the operating parameter detecting means detects a running speed (VP) of the vehicle, and the predetermined continuation condition is satisfied when the detected operation amount (TH) is less than a value which is obtained by adding a predetermined value ($\alpha$) to the determination threshold value (THCSH), an amount (DTH) of change in the detected operation amount is less than a predetermined amount (DTH1) of change in the operation amount, and an amount (DVP) of change in the detected running speed (VP) of the vehicle is less than a predetermined amount (VP1) of change in the running speed.

Preferably, the operating parameter detecting means detects a rotational speed (NE) of the engine, and the predetermined continuation condition is satisfied when the detected operation amount (TH) is less than a value which is obtained by adding a predetermined value ($\alpha$) to the determination threshold value (THCSH), an amount (DTH) of change in the detected operation amount is less than a predetermined amount (DTH1) of change in the operation amount, and an amount (DNE) of change in the detected rotational speed (NE) of the engine is less than a predetermined amount (DNE1) of change in the rotational speed.

Preferably, the operating parameter detecting means detects a running speed (VP) of the vehicle and a gear position (GP) of a transmission of the vehicle, and the determination threshold value (THCS) is set according to the detected running speed (VP) and gear position (GP).

The present invention further provides a control system for an internal combustion engine (1) having a plurality of cylinders and switching means (30) for switching between an all-cylinder operation in which all of the plurality of cylinders are operated and a partial-cylinder operation in which at least one of the plurality of cylinders is halted. The control system includes operation amount detecting means, condition determining means, and instructing means. The operation amount detecting means detects an operation amount (TH) indicative of a required output power of the engine. The condition determining means determines a condition for performing the partial-cylinder operation based on the operation amount (TH) detected by the operation amount detecting means. The instructing means instructs the switching means to perform the partial-cylinder operation or the all-cylinder operation according to a result of the determination. The condition determining means includes filtering means for performing a low-pass filtering (S51) of the operation amount (TH), and determines the condition for performing the partial-cylinder operation based on the operation amount (THFLT) filtered by the filtering means, when the partial-cylinder operation is being performed (FCYLSTP=1).

According to the configuration, when the partial-cylinder operation is being performed, the condition for performing the partial-cylinder operation is determined based on the low-pass-filtered operation amount. Accordingly, when the vehicle driver operates the accelerator pedal during the partial-cylinder operation in such a manner that he returns the accelerator pedal immediately after he depresses the acceleration pedal a little without an intention of accelerating the vehicle, the operation mode of the engine is not switched because the operation amount is averaged by the low-pass filtering. Consequently, frequent switching shocks or deterioration of the fuel efficiency can be prevented.

Preferably, the condition determining means determines that the condition for performing the partial-cylinder operation is satisfied, when the detected operation amount (TH) is less than a determination threshold value (THCS).

Preferably, the control system further includes vehicle speed detecting means for detecting a running speed (VP) of the vehicle and gear position detecting means for detecting a gear position (GP) of a transmission of the vehicle, and the determination threshold value (THCS) is set according to the detected running speed (VP) and gear position (GP).

DETAILED DESCRIPTION OF THE PREFERRED EMBODIMENTS

Embodiments of the present invention will be hereinafter described with reference to the drawings.

First Embodiment

Figure 1:
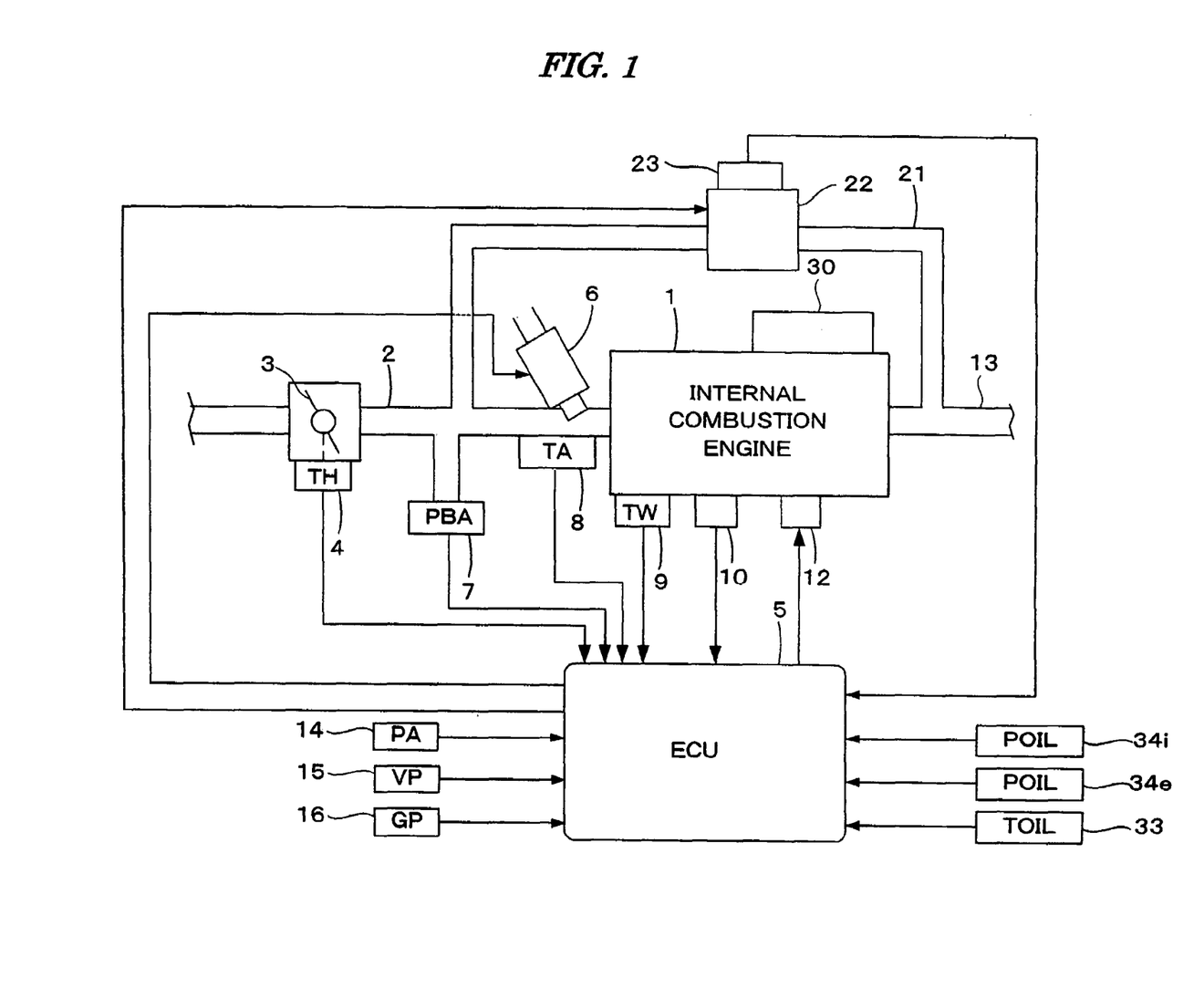
FIG. 1 is a schematic diagram showing a configuration of an internal combustion engine and a control system therefor according to an embodiment of the present invention.
Figure 2:
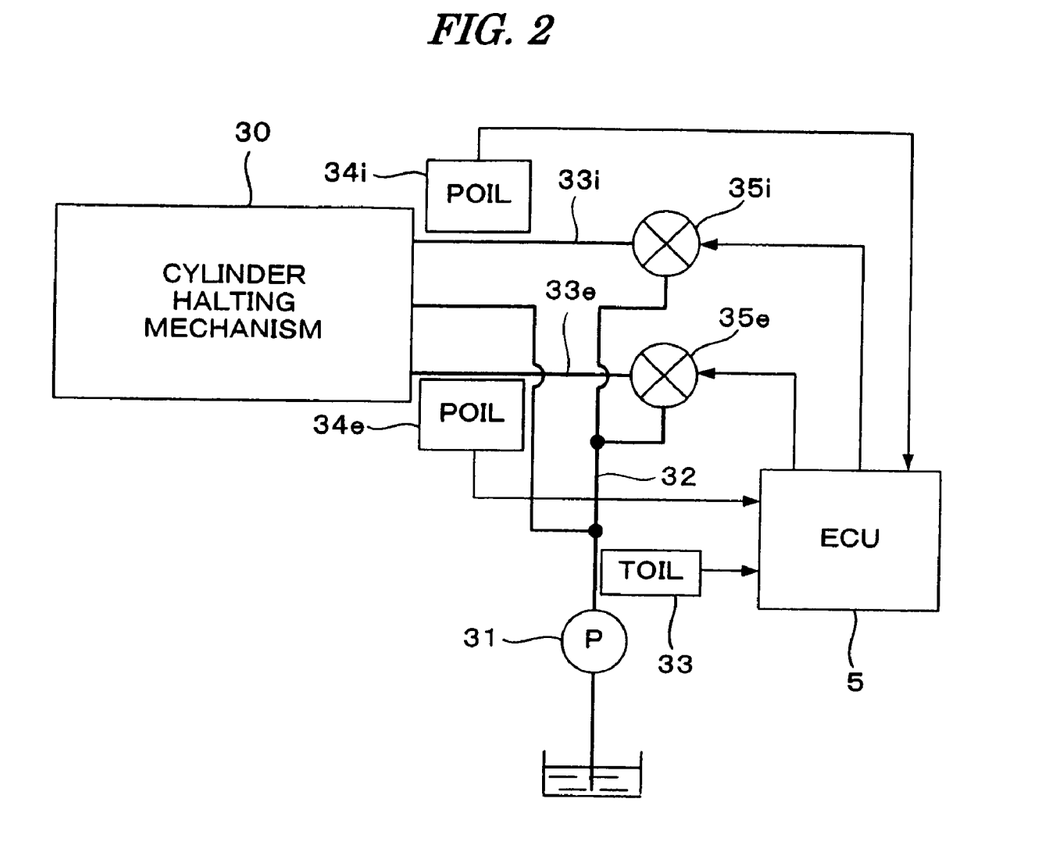
FIG. 2 is a schematic diagram showing a configuration of a hydraulic control system of a cylinder halting mechanism.

FIG. 1 is a schematic diagram of an internal combustion engine and a corresponding control system according to a first embodiment of the present invention. The internal combustion engine 1, which may be, for example, a V-type six-cylinder internal combustion engine but is hereinafter referred to simply as "engine", has a right bank provided with cylinders #1, #2, and #3 and a left bank provided with cylinders #4, #5, and #6. The right bank is further provided with a cylinder halting mechanism 30, which temporarily halts operation of cylinders #1 to #3. FIG. 2 is a schematic diagram of a hydraulic circuit for hydraulically driving the cylinder halting mechanism 30 and a control system for the hydraulic circuit. FIG. 2 will be referred to in conjunction with FIG. 1.

The engine 1 has an intake pipe 2 provided with a throttle valve 3. The throttle valve 3 is provided with a throttle valve opening sensor 4, which detects the throttle valve 3 is open TH. A detection signal output from the throttle opening sensor 4 is supplied to an electronic control unit, which is hereinafter referred to as "ECU 5".

Fuel injection valves 6, for respective cylinders, are inserted into the intake pipe 2 at locations intermediate the engine 1 and the throttle valve 3, and slightly upstream of respective intake valves (not shown). Each fuel injection valve 6 is connected to a fuel pump (not shown) and electrically connected to the ECU 5. A valve opening period of each fuel injection valve 6 is controlled by a signal from the ECU 5.

An absolute intake pressure (PBA) sensor 7 is provided immediately downstream of the throttle valve 3 and detects a pressure in the intake pipe 2. An absolute pressure signal converted to an electrical signal by the absolute intake pressure sensor 7 is supplied to the ECU 5. An intake air temperature (TA) sensor 8 is provided downstream of the absolute intake pressure sensor 7 and detects an intake air temperature TA. An electrical signal corresponding to the detected intake air temperature TA is output from the sensor 8 and supplied to the ECU 5.

An engine coolant temperature (TW) sensor 9 such as, for example, a thermistor, is mounted on the body of the engine 1 and detects an engine coolant temperature, i.e., a cooling water temperature, TW. A temperature signal corresponding to the detected engine coolant temperature TW is output from the sensor 9 and supplied to the ECU 5.

A crank angle position sensor 10 detects a rotational angle of the crankshaft (not shown) of the engine 1 and is connected to the ECU 5. A signal corresponding to the detected rotational angle of the crankshaft is supplied to the ECU 5. The crank angle position sensor 10 includes a cylinder discrimination sensor which outputs a pulse at a predetermined crank angle position for a specific cylinder of the engine 1, the pulse hereinafter is referred to as "CYL pulse". The crank angle position sensor 10 also includes a top dead center (TDC) sensor which outputs a TDC pulse at a crank angle position before a TDC of a predetermined crank angle starts at an intake stroke in each cylinder, i.e., at every 120 deg crank angle in the case of a six-cylinder engine, and a constant crank angle (CRK) sensor for generating one pulse with a CRK period, e.g., a period of 30 deg, shorter than the period of generation of the TDC pulse, the pulse hereinafter is referred to as "CRK pulse". The CYL pulse, the TDC pulse, and the CRK pulse are supplied to the ECU 5. The CYL, TDC, and CRK pulses are used to control the various timings, such as a fuel injection timing and an ignition timing, and to detect an engine rotational speed NE.

The cylinder halting mechanism 30 is hydraulically driven using lubricating oil of the engine 1 as operating oil. The operating oil, which is pressurized by an oil pump 31, is supplied to the cylinder halting mechanism 30 via an oil passage 32, an intake side oil passage 33i, and an exhaust side oil passage 33e. An intake side solenoid valve 35i is provided between the oil passage 32 and the intake side oil passage 33i, and an exhaust side solenoid valve 35e is provided between the oil passage 32 and the exhaust side oil passage 33e. The intake and exhaust side solenoid valves 35i and 35e, respectively, are connected to the ECU 5 so operation of the solenoid valves 35i and 35e is controlled by the ECU 5.

Hydraulic switches 34i and 34e, which are turned on when the operating oil pressure drops to a pressure lower than a predetermined threshold value, are provided, respectively, for the intake and exhaust side oil passages 33i and 33e. Detection signals of the hydraulic switches 34i and 34e are supplied to the ECU 5. An operating oil temperature sensor 33, which detects an operating oil temperature TOIL, is provided in the oil passage 32, and a detection signal of the operating oil temperature sensor 33 is supplied to the ECU 5.

An exemplary configuration of a cylinder halting mechanism is disclosed in Japanese Patent Laid-open No. Hei 10-103097, and a similar cylinder halting mechanism is used as the cylinder halting mechanism 30 of the present invention. The contents of Japanese Patent Laid-open No. Hei 10-103097 are hereby incorporated by reference. According to the cylinder halting mechanism 30, when the solenoid valves 35i and 35e are closed and the operating oil pressures in the oil passages 33i and 33e are low, the intake valves and the exhaust valves of the cylinders, i.e., #1 to #3, perform normal opening and closing movements. On the other hand, when the solenoid valves 35i and 35e are open and the operating oil pressures in the oil passages 33i and 33e are high, the intake valves and the exhaust valves of the cylinders, i.e., #1 to #3, maintain their closed state. In other words, while the solenoid valves 35i and 35e are closed, all-cylinder operation of the engine 1, in which all cylinders are operating, is performed, and if the solenoid valves 35i and 35e are opened, partial-cylinder operation, in which the cylinders #1 to #3 do not operate and only the cylinders #4 to #6 are operating, is performed.

An exhaust gas recirculation passage 21 extends between a portion of the intake pipe 2 downstream of the throttle valve 3 and an exhaust pipe 13. The exhaust gas recirculation passage 21 has an exhaust gas recirculation valve, hereinafter referred to as "EGR valve" 22, to control the amount of a recirculated exhaust gas. The EGR valve 22 includes a solenoid-operated valve, the opening of the valve being controlled by the ECU 5. The EGR valve 22 is combined with a lift sensor 23 to detect its valve opening, i.e., valve lift amount, LACT, and supplies a detection signal to the ECU 5. The exhaust gas recirculation passage 21 and the EGR valve 22 jointly form an exhaust gas recirculation mechanism.

A spark plug 12 is provided in each cylinder of the engine 1. Each spark plug 12 is connected to the ECU 5, and a drive signal for each spark plug 12, i.e., an ignition signal, is supplied from the ECU 5.

An atmospheric pressure sensor 14 for detecting the atmospheric pressure PA, a vehicle speed sensor 15 for detecting a running speed (vehicle speed) VP of the vehicle driven by the engine 1, and a gear position sensor 16 for detecting a gear position GP of a transmission of the vehicle. Detection signals of these sensors are supplied to the ECU 5.

The ECU 5 includes an input circuit, a central processing unit, which is hereinafter referred to as "CPU", a memory circuit, and an output circuit. The input circuit performs numerous functions, including, but not limited to, shaping the waveforms of input signals from the various sensors, correcting the voltage levels of the input signals to a predetermined level, and converting analog signal values into digital signal values. The memory circuit preliminarily stores various operating programs to be executed by the CPU and stores the results of computations or the like by the CPU. The output circuit supplies drive signals to the fuel injection valves 6, the spark plugs 12, the EGR valve 22, and the solenoid valves 35i and 35e. The ECU 5 controls the valve opening period of each fuel injection valve 6, the ignition timing, and the opening of the EGR valve 22 according to the detection signals from the various sensors. The ECU 5 further operates the intake and exhaust side solenoid valves 35i and 35e to perform switching control between the all-cylinder operation and the partial-cylinder operation of the engine 1.

Figure 3:
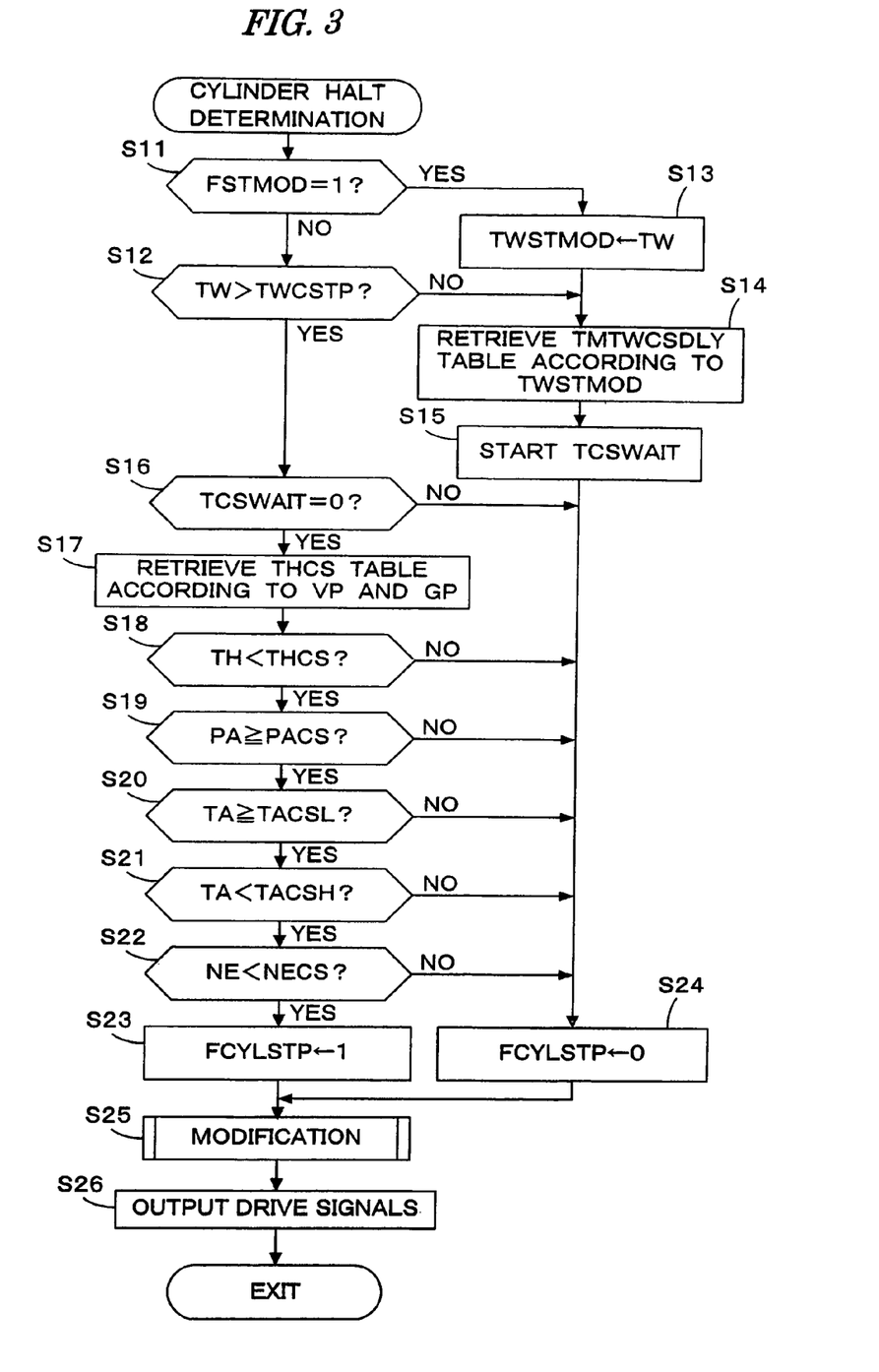
FIG. 3 is a flow chart of a process for determining a cylinder halt condition.

FIG. 3 is a flow chart of a process of determining an execution condition of the cylinder halt (partial-cylinder operation) in which some of the cylinders are halted. This process is executed at predetermined intervals (for example, 10 milliseconds) by the CPU of in ECU 5.

Figure 4:
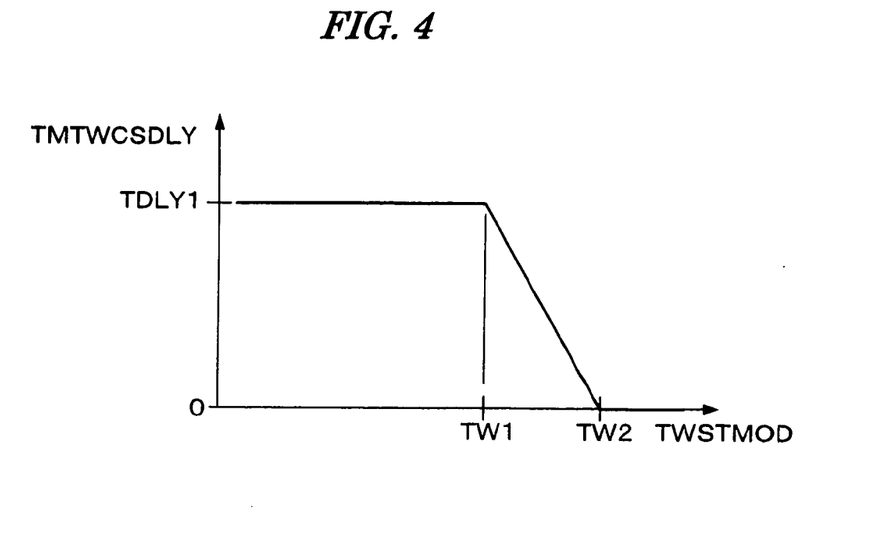
FIG. 4 is a graph showing a TMTWCSDLY table used in the process of FIG. 3.

In step S11, it is determined whether or not an start mode flag FSTMOD is "1". If FSTMOD is equal to "1", which indicates that the engine 1 is starting (cranking), then the detected engine water temperature TW is stored as a start mode water temperature TWSTMOD (step S13). Next, a TMTWCSDLY table shown in FIG. 4 is retrieved according to the start mode water temperature TWSTMOD to calculate a delay time TMTWCSDLY. In the TMTWCSDLY table, the delay time TMTWCSDLY is set to a predetermined delay time TDLY1 (for example, 250 seconds) in the range where the start mode water temperature TWSTMOD is lower than a first predetermined water temperature TW1 (for example, 40° C.). The delay time TMTWCSDLY is set so as to decrease as the start mode water temperature TWSTMOD rises in the range where the start mode water temperature TWSTMOD is equal to or higher than the first predetermined water temperature TW1 and lower than a second predetermined water temperature TW2 (for example, 60° C.). Further, the delay time TMTWCSDLY is set to "0" in the range where the start mode water temperature TWSTMOD is higher than the second predetermined water temperature TW2.

In next step S15, a downcount timer TCSWAIT is set to the delay time TMTWCSDLY and started, and a cylinder halt flag FCYLSTP is set to "0" (step S24). This indicates that the execution condition of the cylinder halt is not satisfied.

If FSTMOD is equal to "0" in step S11, i.e., the engine 1 is operating in the ordinary operation mode, then it is determined whether or not the engine water temperature TW is higher than a cylinder halt determination temperature TWCSTP (for example, 75° C.) (step S12). If TW is less than or equal to TWCSTP, then it is determined that the execution condition is not satisfied, and the process advances to step S14. When the engine water temperature TW is higher than the cylinder halt determination temperature TWCSTP, the process advances from step S12 to step S16, in which it is determined whether or not a value of the timer TCSWAIT started in step S15 is "0". While TCSWAIT is greater than "0", the process advances to step S24. When TCSWAIT becomes "0", then the process advances step S17.

Figure 5:
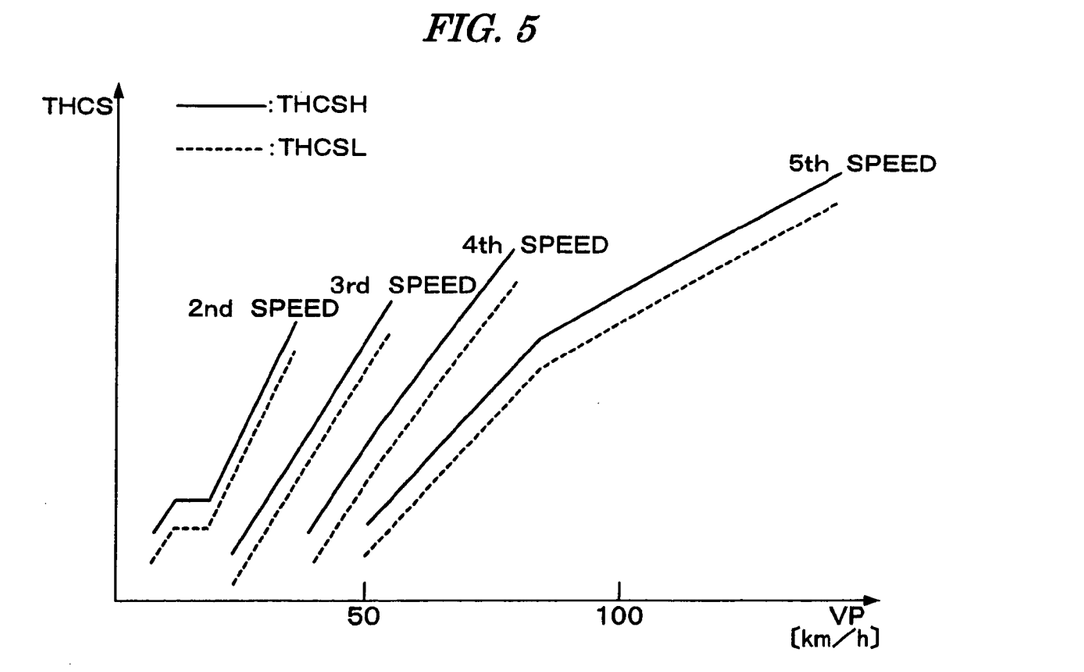
FIG. 5 is a graph showing a THCS table used in the process of FIG. 3.

In step S17, a THCS table shown in FIG. 5 is retrieved according to the vehicle speed VP and the gear position GP to calculate an upper side threshold value THCSH and a lower side threshold value THCSL which are used in the determination in step S18. In FIG. 5, the solid lines correspond to the upper side threshold value THCSH and the broken lines correspond to the lower side threshold value THCSL. The THCS table is set for each gear position GP such that, at each of the gear positions (from second speed to fifth speed), the upper side threshold value THCSH and the lower side threshold value THCSL may increase as the vehicle speed VP increases. It should be noted that at the gear position of 2nd speed, there is provided a region where the upper side threshold value THCSH and the lower side threshold value THCSL are maintained at a constant value even if the vehicle speed VP varies. Further, at the gear position of 1st speed, the upper side threshold value THCSH and the lower side threshold value THCSL are set, for example, to "0", since the all-cylinder operation is always performed. Furthermore, the threshold values (THCSH and THCSL) corresponding to a lower speed side gear position GP are set to greater values than the threshold values (THCSH and THCSL) corresponding to a higher speed side gear position GP when compared at a certain vehicle speed.

In step S18, a determination of whether or not the throttle valve opening TH is less than the threshold value THCS is executed with hysteresis. Specifically, when the cylinder halt flag FCYLSTP is "1", and the throttle valve opening TH increases to reach the upper side threshold value THCSH, then the answer to step S18 becomes negative (NO), while when the cylinder halt flag FCYLSTP is "0", and the throttle valve opening TH decreases to become less than the lower side threshold value THCSL, then the answer to step S18 becomes affirmative (YES).

If the answer to step S18 is affirmative (YES), it is determined whether or not the atmospheric pressure PA is equal to or higher than a predetermined pressure PACS (for example, 86.6 kPa (650 mmHg)) (step S19). If the answer to step S19 is affirmative (YES), then it is determined whether or not the intake air temperature TA is equal to or higher than a predetermined lower limit temperature TACSL (for example, −10° C.) (step S20). If the answer to step S20 is affirmative (YES), then it is determined whether or not the intake air temperature TA is lower than a predetermined upper limit temperature TACSH (for example, 45° C.) (step S21). If the answer to step S21 is affirmative (YES), then it is determined whether or not the engine speed NE is lower than a predetermined speed NECS (step S22). The determination of step S22 is executed with hysteresis similarly as in step S18. Specifically, when the cylinder halt flag FCYLSTP is "1", and the engine speed NE increases to reach an upper side speed NECSH (for example, 3,500 rpm), then the answer to step S22 becomes negative (NO), while when the cylinder halt flag FCYLSTP is "0", and the engine speed NE decreases to become lower than a lower side speed NECSL (for example, 3,300 rpm), then the answer to step S22 becomes affirmative (YES).

When the answer to any of steps S18 to S22 is negative (NO), it is determined that the execution condition of the cylinder halt is not satisfied, and the process advances to step S24. On the other hand, if all of the answers to steps S18 to S22 are affirmative (YES), it is determined that the execution condition of the cylinder halt is satisfied, and the cylinder halt flag FCYLSTP is set to "1" (step S23).

Figure 6:
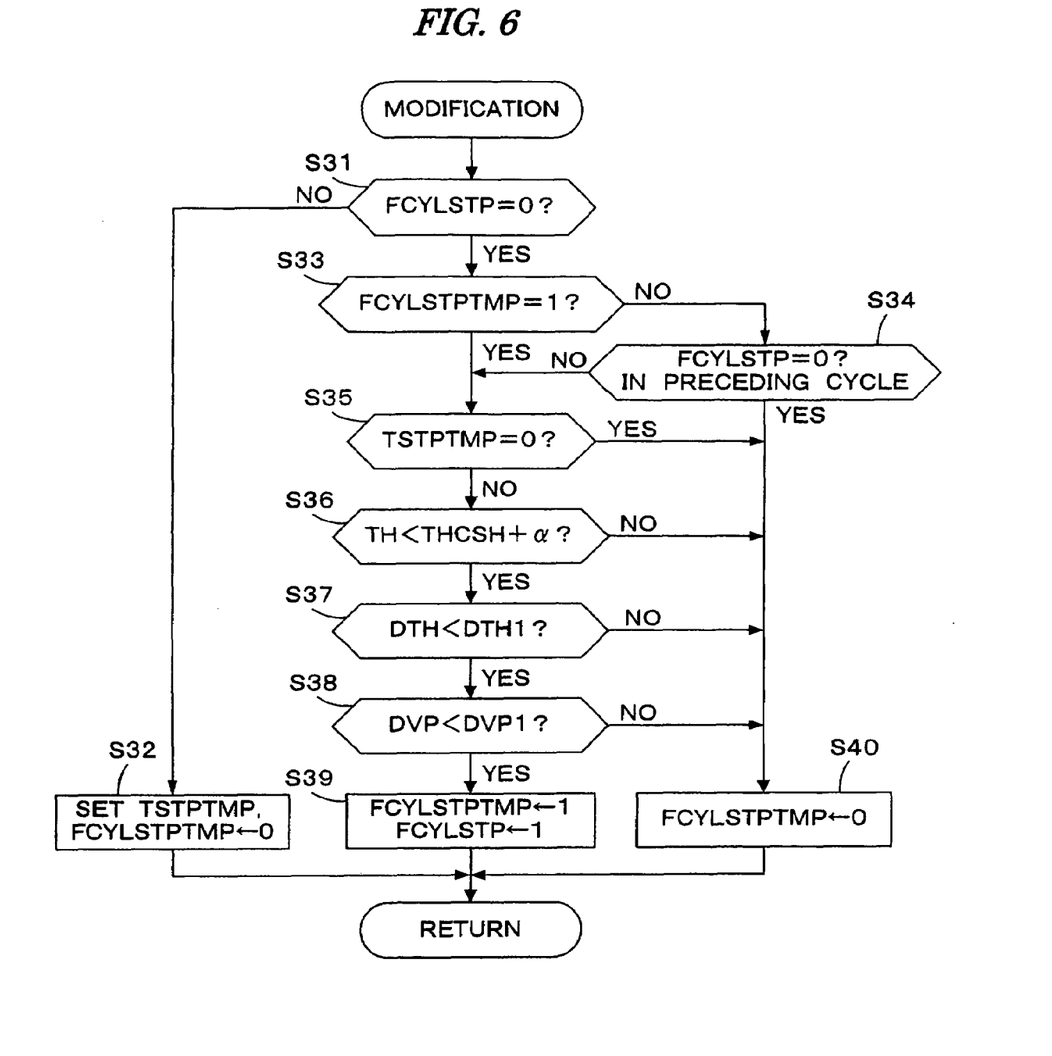
FIG. 6 is a flow chart of a modification process executed in the process of FIG. 3.

In step S25, the modification process shown in FIG. 6 is executed. In step S31 of FIG. 6, it is determined whether or not the cylinder halt flag FCYLSTP is "0". If FCYLSTP is equal to "1", indicating that the execution condition of the cylinder halt is satisfied, then the downcount timer TSTPTMP is set to predetermined time period TSTPTMP0 (for example, 1 second) and started, and the continuation flag FCYLSTPTMP is set to "0" (step S32).

If FCYLSTP is equal to "0" in step S31, indicating that the execution condition of the cylinder halt is not satisfied, then it is determined whether or not the continuation flag FCYLSTPTMP is "1" (step S33). The continuation flag FCYLSTPTMP is equal to "0" immediately after the transition from the state where the execution condition of the cylinder halt is satisfied (FCYLSTP=1) to the state where the execution condition of the cylinder halt is not satisfied (FCYLSTP=0). Accordingly, the process advances to step S34, in which it is determined whether or not the cylinder halt flag FCYLSTP was "0" in the preceding cycle. Since the present answer to step S34 is negative (NO), the processing advances to step S35, at which it is determined whether or not a value of the timer TSTPTMP started in step S32 is "0". While TSTPTMP is greater than "0", the process advances to step S36, in which it is determined whether or not the throttle valve opening TH is less than a value obtained by adding a predetermined value α (for example, 2 degrees) to the upper side threshold value THCSH. If the answer to step S36 is affirmative (YES), then it is determined whether or not a change amount DTH of the throttle valve opening TH is less than the predetermined change amount DTH1 (for example, 1 degree per 10 milliseconds) (step S37). The throttle valve opening change amount DTH is calculated as a difference (TH(n)−TH(n−1)) between the present value TH(n) and the preceding value TH(n−1) of the throttle valve opening.

When the answer to step S37 is affirmative (YES), it is determined whether or not a change amount DVP of the vehicle speed VP is less than the predetermined vehicle speed change amount DVP1 (for example, 0.01 km/h per 10 milliseconds) (step S38). The vehicle speed change amount DVP is calculated as a difference (VP(n)−VP(n−1)) between the present value VP(n) and the preceding value VP(n−1) of the vehicle speed.

When the answer to any of the steps S36 to S38 is negative (NO), that is, when the predetermined continuation condition is not satisfied, the process advances to step S40, in which the continuation flag FCYLSTPTMP is set to "0". Consequently, the process from step S33 to step S40 via step S34 is executed thereafter. In this instance, since the cylinder halt flag FCYLSTP remains "0", the operation mode of the engine immediately changes from the partial-cylinder operation to the all-cylinder operation.

On the other hand, when all of the answers to steps S36 to S38 are affirmative (YES), indicating that the predetermined continuation condition is satisfied, the continuation flag FCYLSTPTMP is set to "1" and the cylinder halt flag FCYLSTP is modified to "1" (step S39). Accordingly, in this instance, even if the execution condition of the cylinder halt is not satisfied, the partial-cylinder operation is continued. When the continuation flag FCYLSTPTMP is set to "1", the answer to step S33 is affirmative (YES) thereafter. Therefore, the partial-cylinder operation is continued as long as the predetermined continuation condition is satisfied.

Thereafter, if the value of the downcount timer TSTPTMP becomes "0" in step S35, then the process advances to step S40. Accordingly, at this point of time, the operation mode of the engine changes from the partial-cylinder operation to the all-cylinder operation. Thereafter, the process from step S33 to step S40 via step S34 is executed.

It is to be noted that, even when the value of the timer TSPTMP is greater than "0", if the answer to any of steps S36 to S38 becomes negative (NO), indicating that the predetermined continuation condition becomes dissatisfied, then the process advances directly to step S40, in which the operation mode of the engine shifts to the all-cylinder operation.

Further, if the execution condition of the cylinder halt becomes satisfied again before the value of the timer TSTPTMP reaches "0", then the answer to step S31 becomes negative (NO), and the partial-cylinder operation is continued.

Referring back to FIG. 3, in step S26, the drive signals for the solenoid valves 35i and 35e are output according to the cylinder halt flag FCYLSTP.

When the cylinder halt flag FCYLSTP is set to "1" at the time the modification process of FIG. 6 is completed, the partial-cylinder operation in which cylinders #1 to #3 are halted while cylinders #4 to #6 are operated, is performed. When the cylinder halt flag FCYLSTP is set to "0", the all-cylinder operation in which all of cylinders #1 to #6 are operated, is performed.

As described above, according to the processes of FIGS. 3 and 6, when the state where the execution condition of the cylinder halt is satisfied changes to the state where the execution condition of the cylinder halt is not satisfied, the partial-cylinder operation is continued for the predetermined time period TSTPTMP0 from the time of the state change, as long as the predetermined continuation condition (steps S36 to S38) is satisfied. When the execution condition of the cylinder halt is satisfied again within the predetermined time period TSTPTMP0, the partial-cylinder operation is continued without changing to the all-cylinder operation. Accordingly, when the vehicle driver operates the accelerator pedal during the partial-cylinder operation in such a manner that he returns the accelerator pedal immediately after he depresses the acceleration pedal a little without an intention of accelerating the vehicle, the operation mode of the engine is not switched. Consequently, frequent switching shocks or deterioration of the fuel efficiency can be prevented.

In the present embodiment, the cylinder halting mechanism 30 corresponds to the switching means, and the throttle valve opening sensor 4, the intake air temperature sensor 8, the engine water temperature sensor 9, the crank angle position sensor 10, the vehicle speed sensor 15 and the gear position sensor 16 constitute the operating parameter detecting means. Further, the ECU 5 constitutes the instructing means, the condition determining means and the modifying means. Specifically, steps S11 to S24 of FIG. 3 correspond to the condition determining means, and the process of FIG. 6 corresponds to the modifying means. Step S26 of FIG. 3 corresponds to the instructing means.

Second Embodiment

Figure 7:
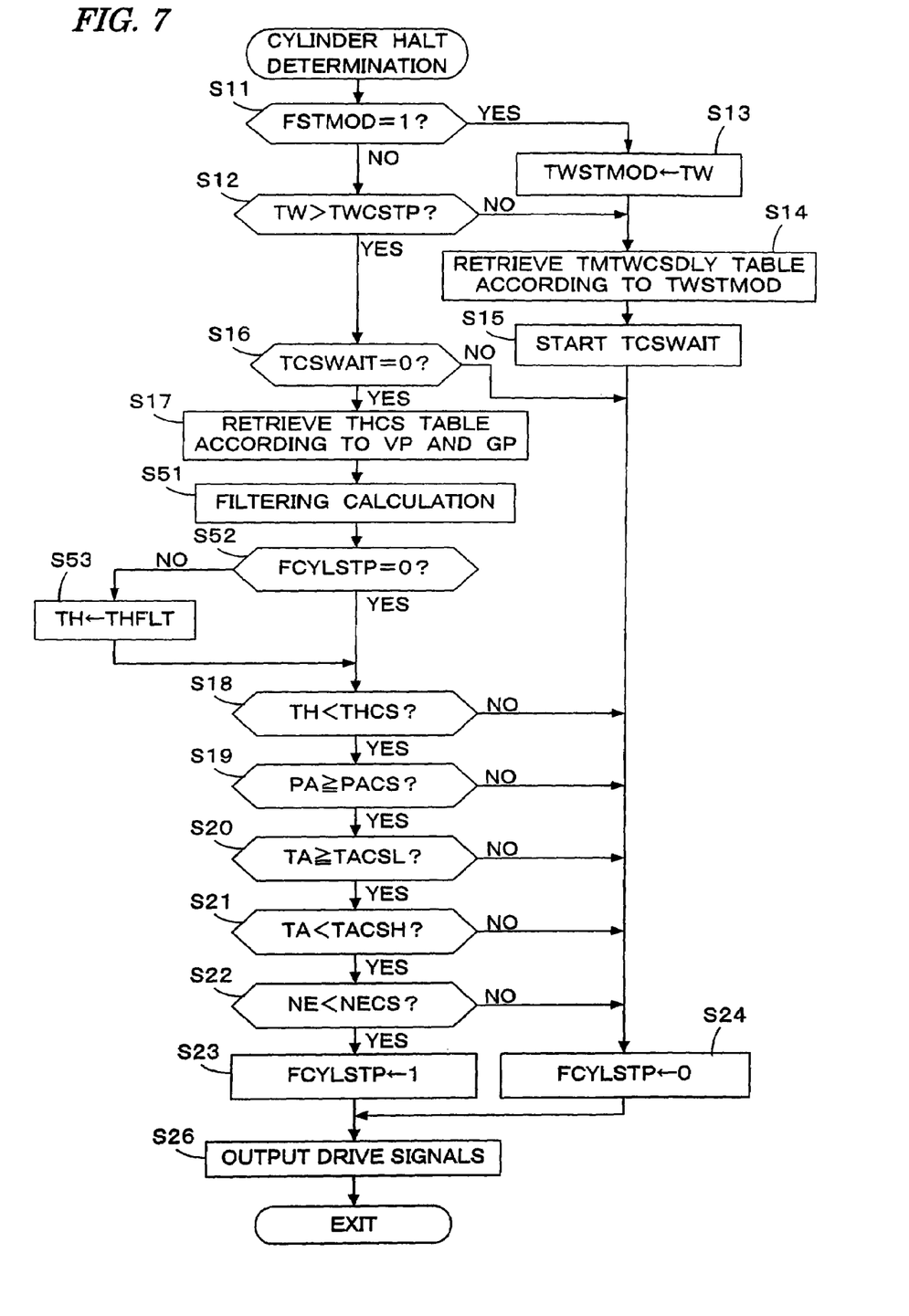
FIG. 7 is a flow chart of another process (second embodiment) for determining a cylinder halt condition.

FIG. 7 is a flow chart of the cylinder halt condition determination process according to a second embodiment of the present invention. The process of FIG. 7 is obtained by deleting step S25 of the process shown in FIG. 3 and adding steps S51, S52 and S53. It is to be noted that the second embodiment is the same as the first embodiment except the points described below.

In step S51, a low-pass filtering calculation of calculating a moving average value THFLT of the throttle valve opening TH is performed in accordance with the following expression (1).

$$THFLT=(TH(n-4)+TH(n-3)+TH(n-2)+TH(n-1)+TH(n))/5 \quad (1)$$

where "n" indicates a sampling time digitized with the execution period of the process of FIG. 7, and TH(n) corresponds to the present value of the throttle valve opening.

In step S52, it is determined whether or not the cylinder halt flag FCYLSTP is "0". If FCYLSTP is equal to "0", indicating that the engine is in the all-cylinder operation, the process advances directly to step S18. If FCYLSTP is equal to "1", indicating that the engine is in the partial-cylinder operation, the throttle valve opening TH is set to the moving average value THFLT calculated in step S51 (step S53). Thereafter the process advances to step S18.

According to the process shown in FIG. 7, when the partial-cylinder operation is being performed, the moving average value THFLT obtained by averaging the throttle valve opening TH is used to execute the determination in step S18. Accordingly, when the vehicle driver operates the accelerator pedal during the partial-cylinder operation in such a manner that he returns the accelerator pedal immediately after he depresses the acceleration pedal a little without an intention of accelerating the vehicle, the operation mode of the engine is not switched. Consequently, frequent switching shocks or deterioration of the fuel efficiency can be prevented.

In the present embodiment, the cylinder halting mechanism 30 corresponds to the switching means, and the throttle valve opening sensor 4 corresponds to the operation amount detecting means. Further, the ECU 5 constitutes the condition determining means, the filtering means, and the instructing means. Specifically, the process of FIG. 7 corresponds to the condition determining means, and step S51 of FIG. 7 corresponds to the filtering means.

It is to be noted that the present invention is not limited to the embodiments described above, but various modifications may be made. For example, the low-pass filtering calculation is not limited to the calculation according to the expression (1) described above, but any low-pass filtering calculation that implements the low-pass characteristic may be used. For example, a moving average calculation according to a sampled data, the number which is different from that of the expression (1), or a averaging calculation according to the following expression (2) may be adopted.

$$THFLT(n)=CFLT \times TH(n)+(1-CFLT) \times THFLT(n-1) \quad (2)$$

where CFLT is a filtering coefficient set to a value between "0" and "1".

In the embodiments described above, the throttle valve opening TH is used as an operation amount indicative of the required output power of the engine 1. Alternatively, an acceleration sensor may be provided for detecting a depressing amount of the accelerator pedal (hereinafter referred to as "accelerator pedal operation amount") AP of a vehicle driven by the engine 1, and the accelerator pedal operation amount AP may be used as an operation amount indicative of the required output power of the engine 1. In this instance, a determination of the cylinder halt condition is performed by processes shown in FIGS. 8 and 9, or FIG. 10. It is to be noted that the accelerator pedal is connected to the throttle valve 3 such that the throttle valve opening TH changes proportionally to the accelerator pedal operation amount AP.

Figure 8:
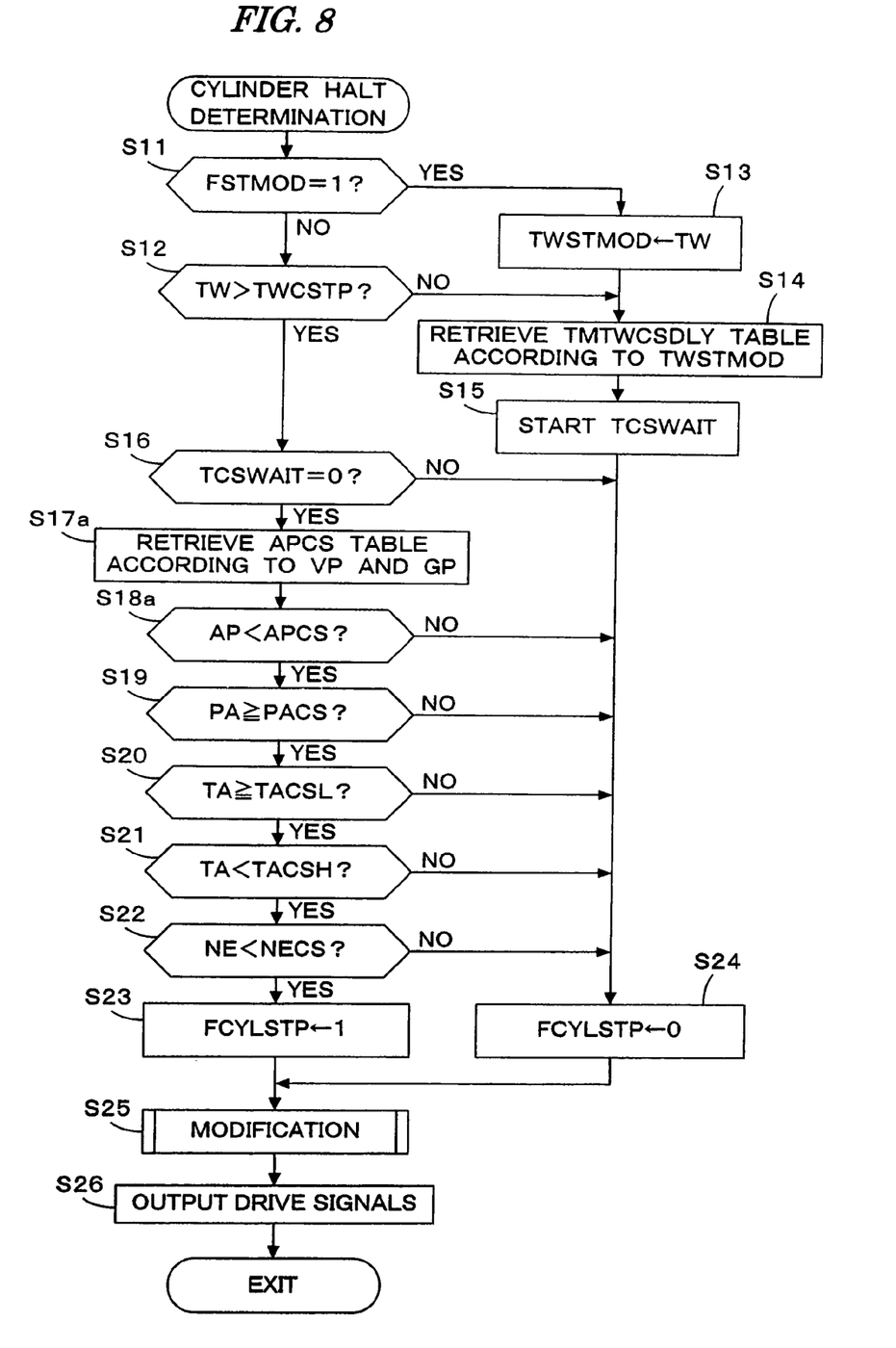
FIG. 8 is a flow chart showing a modification of the process of FIG. 3.

The process shown in FIG. 8 is obtained by replacing steps S17 and S18 of FIG. 3 with steps S17a and S18a, respectively.

In step S17a, an APCS table (not shown) is retrieved according to the vehicle speed VP and the gear position GP to calculate threshold value APCS (a lower side threshold value APCSL and an upper side threshold value APCSH) of the accelerator pedal operation amount AP. In step S18a, it is determined with hysteresis whether or not the detected accelerator pedal operation amount AP is less than the threshold values APCS. The APCS table is set similarly to the THCS table, i.e., set for each of the gear positions GP such that the lower side threshold value APCSL and the upper side threshold value APCSH increase as the vehicle speed VP increases.

Figure 9:
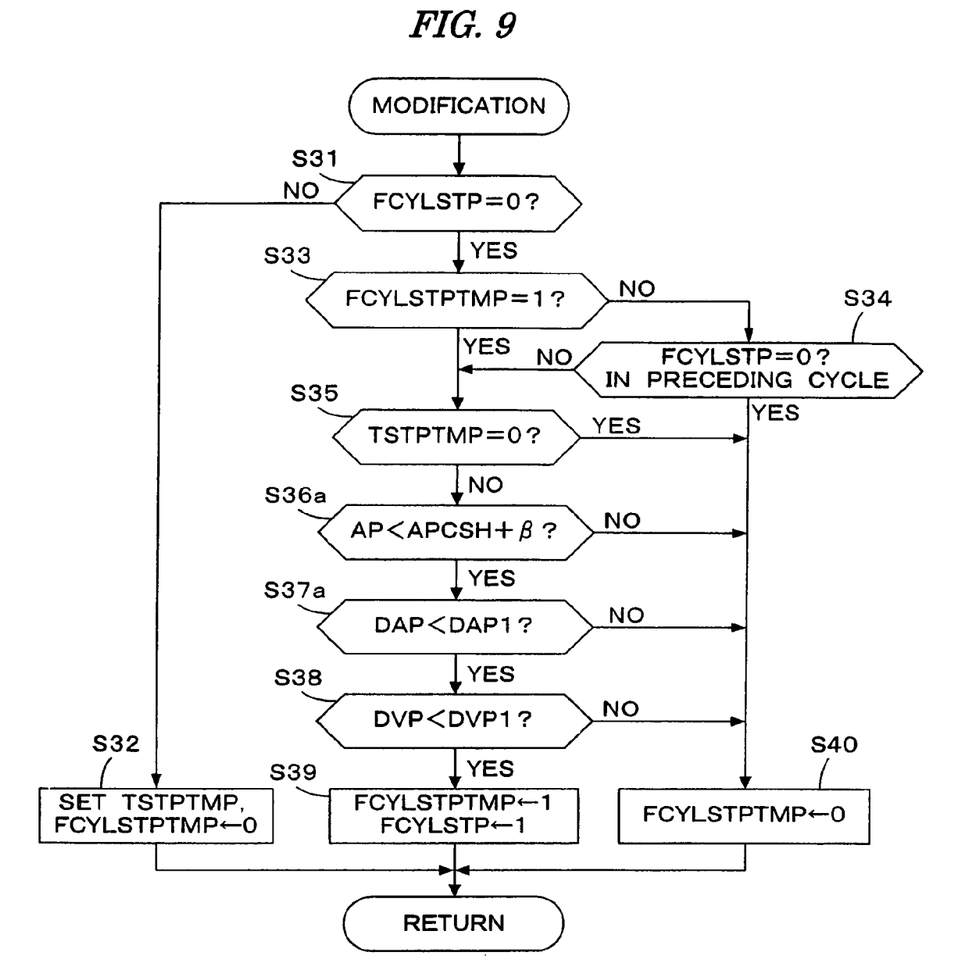
FIG. 9 is a flow chart showing a modification of the process of FIG. 6.

The process shown in FIG. 9 is obtained by replacing steps S36 and S37 of FIG. 6 with steps S36a and S37a, respectively. In step S36a, it is determined whether or not the accelerator pedal operation amount AP is less than a value obtained by adding a predetermined value β (for example, an accelerator pedal operation amount corresponding to 2 degrees of the throttle valve opening) to the upper side threshold value APCSH. If the answer to step S36a is affirmative (YES), then it is determined in step S37a whether or not a change amount DAP of the accelerator pedal operation amount AP is less than a predetermined change amount DAP1 (for example, a change amount of the accelerator pedal operation amount which corresponds to 1 degree/10 milliseconds of the throttle valve opening change amount). The change amount DAP of the accelerator pedal operation amount is calculated as a difference (AP(n)−AP(n−1)) between the present value AP(n) and the preceding vale AP(n−1) of the accelerator pedal operation amount.

Figure 10:
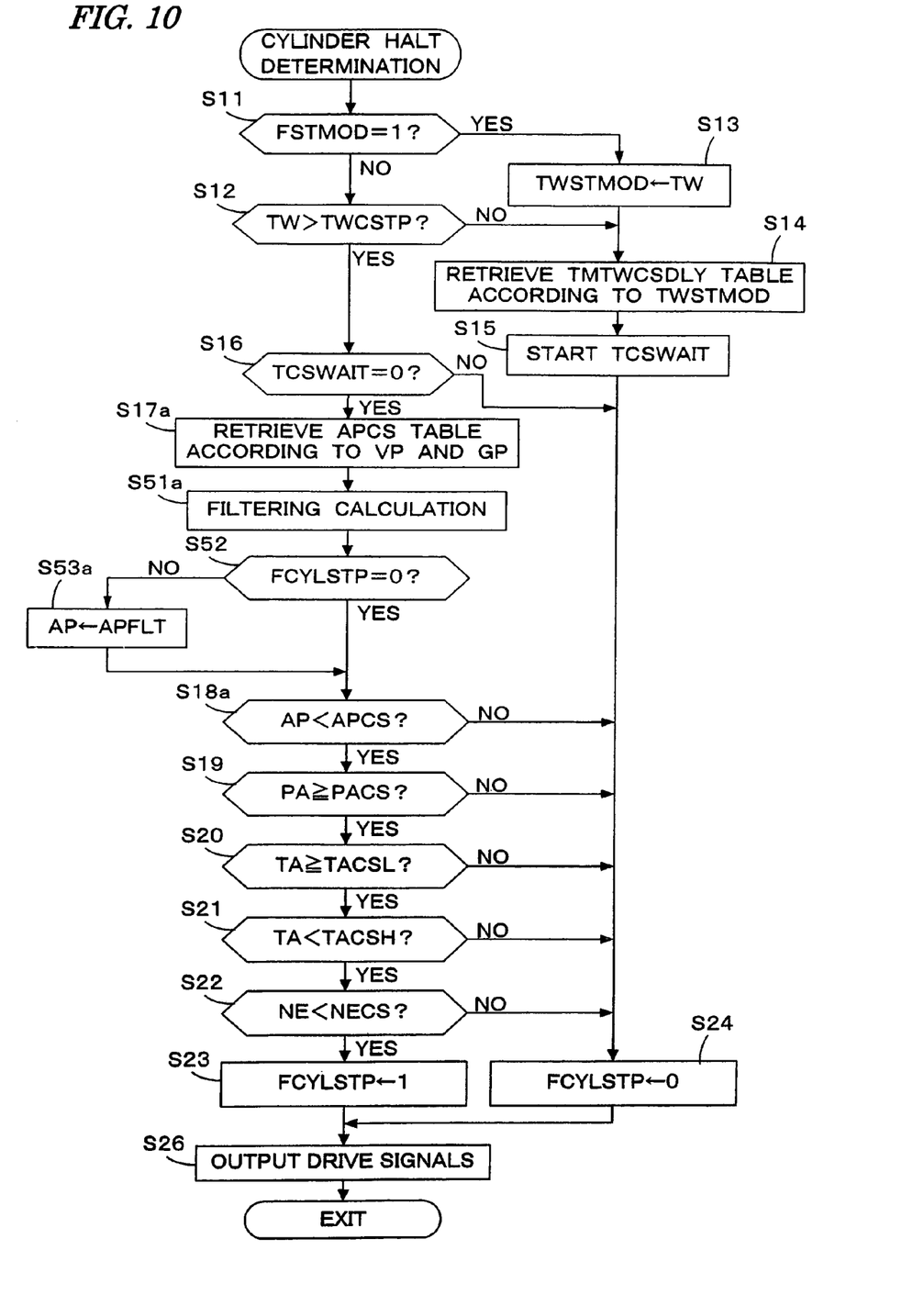
FIG. 10 is a flow chart showing a modification of the process of FIG. 7.

The process shown in FIG. 10 is obtained by replacing steps S17, S51, S53 and S18 of FIG. 7 with steps S17a, S51a, S53a and S18a, respectively. In steps S17a and S18a of FIG. 10, processes that are the same as those in steps S17a and S18a of FIG. 8 are executed, respectively. In step S51a, a low-pass filtering calculation according to the expression (3) given below is performed to calculate a moving average value APFLT of the accelerator pedal operation amount AP.

$$APFLT=(AP(n-4)+AP(n-3)+AP(n-2)+AP(n-1)+AP(n))/5 \quad (3)$$

In step S53a, the accelerator pedal operation amount AP is set to the moving average value APFLT.

Further, in step S38 of FIG. 6 or FIG. 9, it is determined whether or not the change amount DVP of the vehicle speed VP is less than the predetermined vehicle speed change amount DVP1. Alternatively, it may be determined whether or not a change amount DNE of the engine speed NE is less than a predetermined speed change amount DNE1 (for example, 0.2 rpm per 10 milliseconds).

Furthermore, the present invention can be applied also to a control system for a watercraft propulsion engine such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine having a plurality of cylinders and switching means for switching between an all-cylinder operation in which all of said plurality of cylinders are operated and a partial-cylinder operation in which at least one of said plurality of cylinders is halted, said control system comprising:
   operation amount detecting means for detecting an operation amount indicative of a required output power of said engine;
   condition determining means for determining a condition for performing the partial-cylinder operation based on the operation amount detected by said operation amount detecting means; and
   instructing means for instructing said switching means to perform the partial-cylinder operation or the all-cylinder operation according to a result of the determination,
   wherein said condition determining means includes filtering means for performing a low-pass filtering of the operation amount, and determines the condition for performing the partial-cylinder operation based on the operation amount filtered by said filtering means, when the partial-cylinder operation is being performed.

2. A control system according to claim 1, wherein said condition determining means determines that the condition for performing the partial-cylinder operation is satisfied, when the detected operation amount is less than a determination threshold value.

3. A control system according to claim 2, further including vehicle speed detecting means for detecting a running speed of said vehicle and gear position detecting means for detecting a gear position of a transmission of said vehicle,
   wherein the determination threshold value is set according to the detected running speed and gear position.

4. A control method for an internal combustion engine having a plurality of cylinders and a switching mechanism for switching between an all-cylinder operation in which all of said plurality of cylinders are operated and a partial-cylinder operation in which at least one of said plurality of cylinders is halted, said control method comprising the steps of:
   a) detecting an operation amount indicative of a required output power of said engine;
   b) determining a condition for performing the partial-cylinder operation based on the detected operation amount; and
   c) instructing said switching mechanism to perform the partial-cylinder operation or the all-cylinder operation according to a result of the determination in step b),
   wherein said step b) includes the step of performing a low-pass filtering of the operation amount, and the condition for performing the partial-cylinder operation is determined based on the filtered operation amount, when the partial-cylinder operation is being performed.

5. A control method according to claim 4, wherein it is determined that the condition for performing the partial-cylinder operation is satisfied, when the detected operation amount is less than a determination threshold value.

6. A control method according to claim 5, further including the steps of detecting a running speed of said vehicle and detecting a gear position of a transmission of said vehicle,
   wherein the determination threshold value is set according to the detected running speed and gear position.

7. A computer program embodied on a computer readable medium for causing a computer to carry out a control method for an internal combustion engine having a plurality of cylinders and a switching mechanism for switching between an all-cylinder operation in which all of said plurality of cylinders are operated and a partial-cylinder operation in which at least one of said plurality of cylinders is halted, said control method comprising the steps of:

a) detecting an operation amount indicative of a required output power of said engine; and
b) determining a condition for performing the partial-cylinder operation based on the detected operation amount; and
c) instructing said switching mechanism to perform the partial-cylinder operation or the all-cylinder operation according to a result of the determination in step b),
wherein said step b) includes the step of performing a low-pass filtering of the operation amount, and the condition for performing the partial-cylinder operation is determined based on the filtered operation amount, when the partial-cylinder operation is being performed.

8. A computer program embodied on a computer readable medium according to claim 7, wherein it is determined that the condition for performing the partial-cylinder operation is satisfied, when the detected operation amount is less than a determination threshold value.

9. A computer program embodied on a computer readable medium according to claim 8, wherein said control method further includes the steps of detecting a running speed of said vehicle and detecting a gear position of a transmission of said vehicle, and the determination threshold value is set according to the detected running speed and gear position.

* * * * *